Patented Mar. 19, 1946

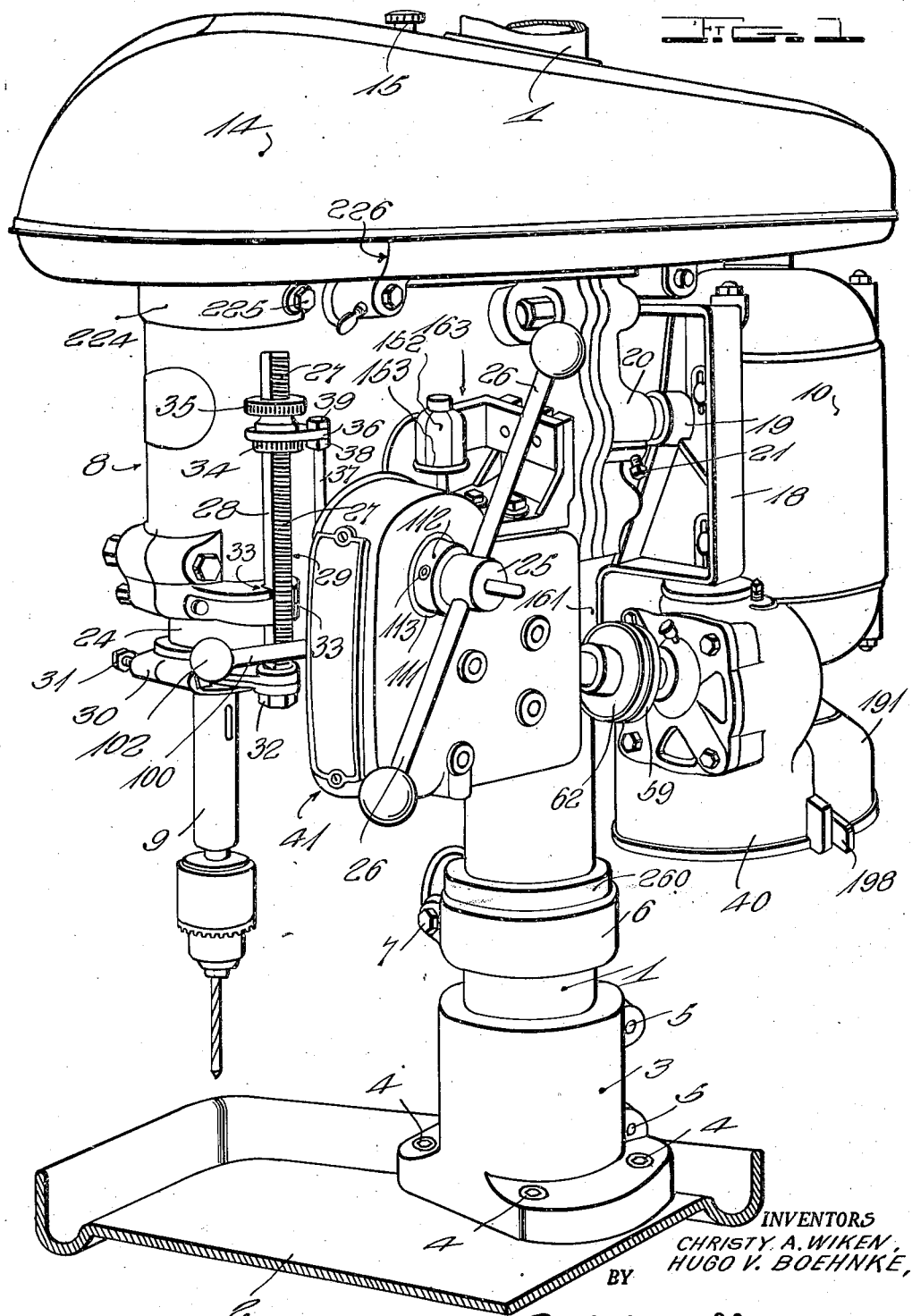

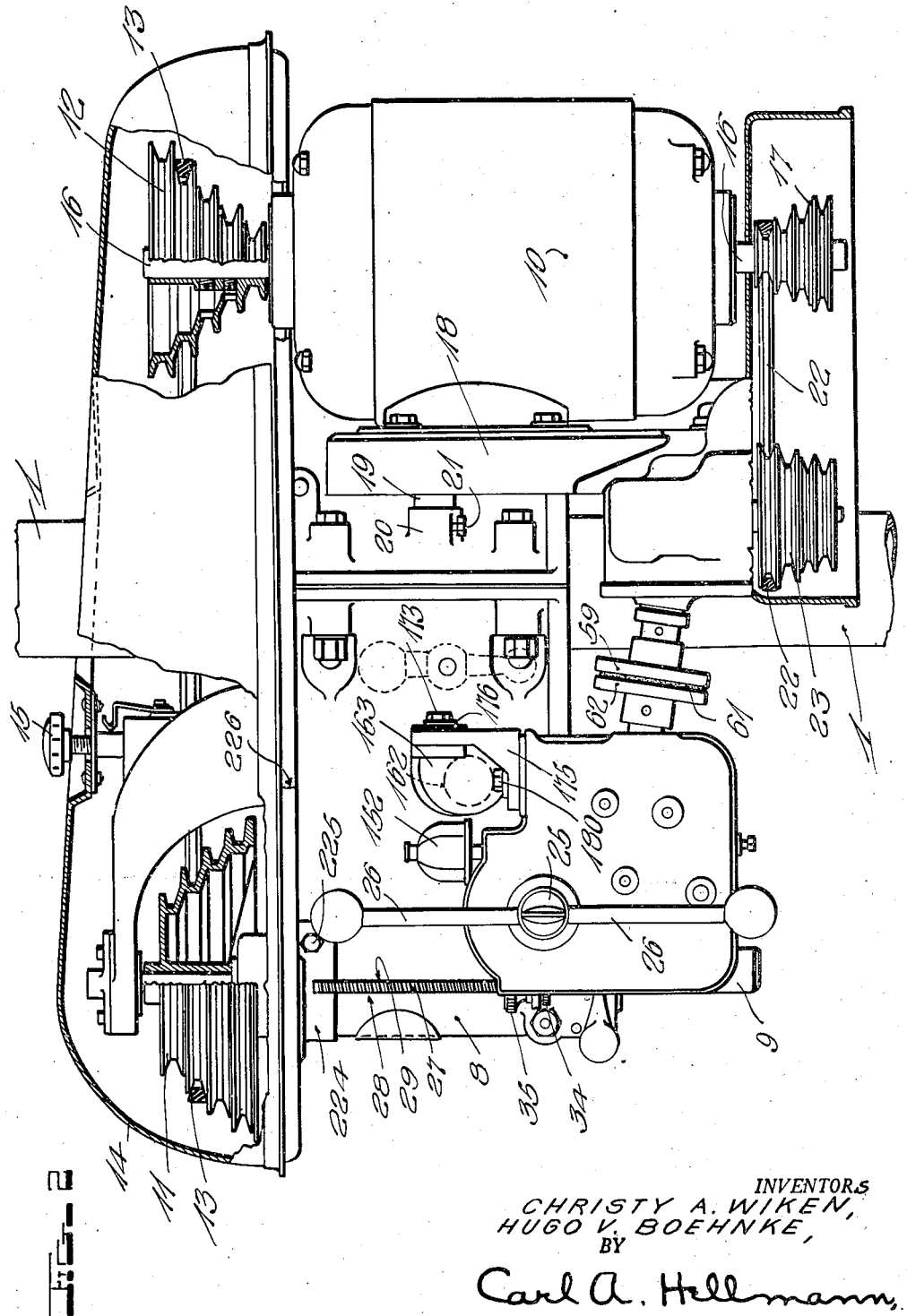

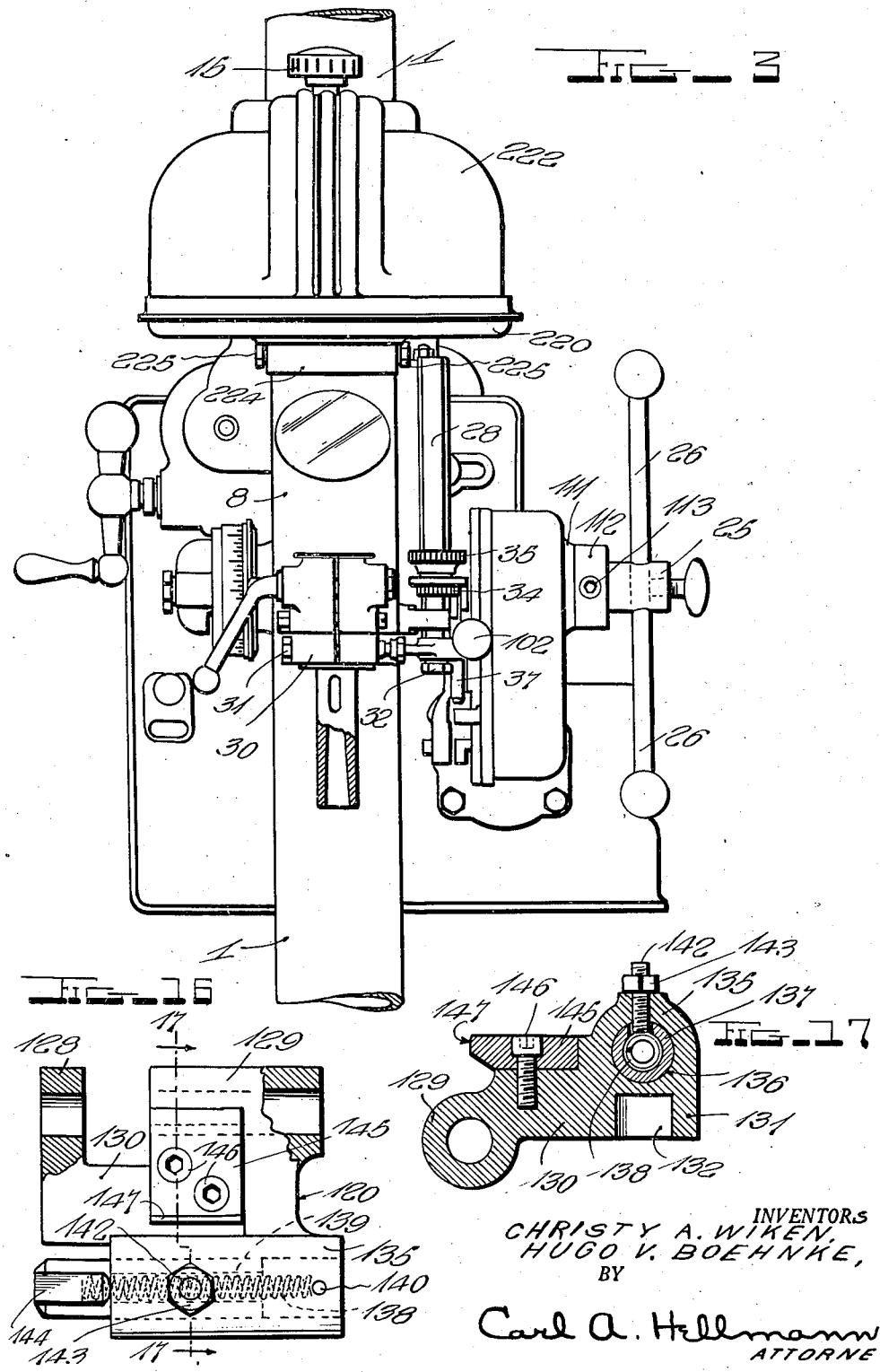

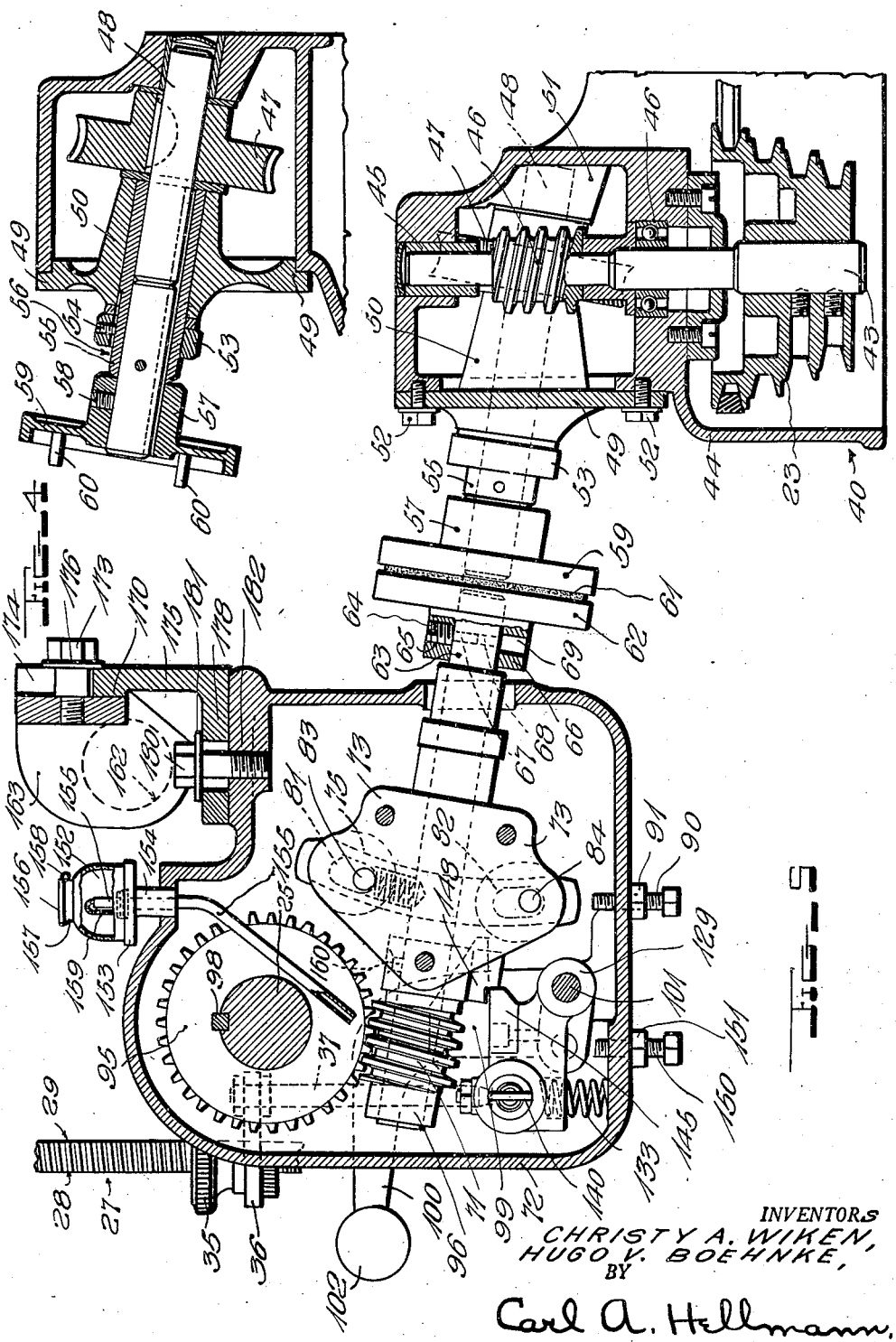

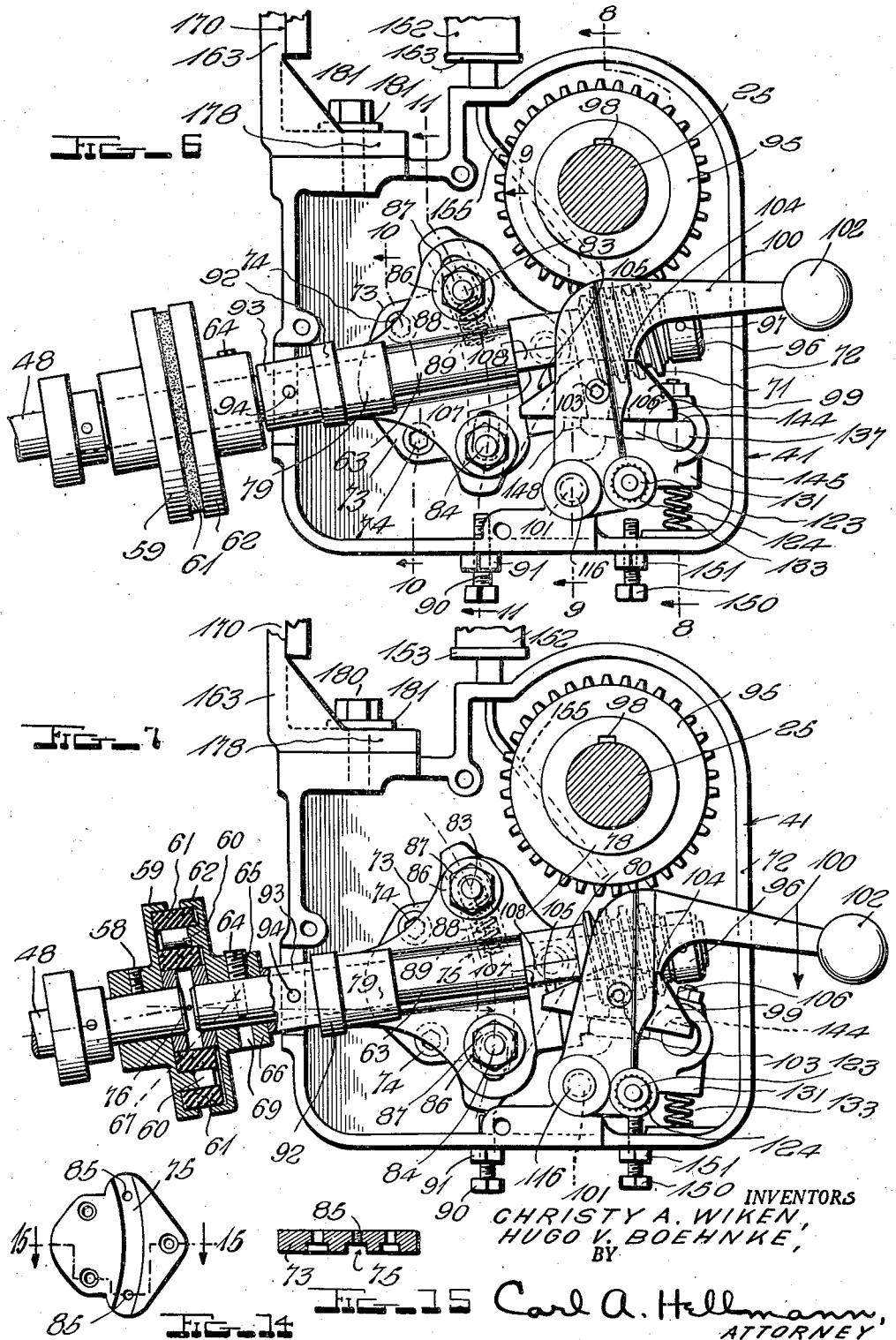

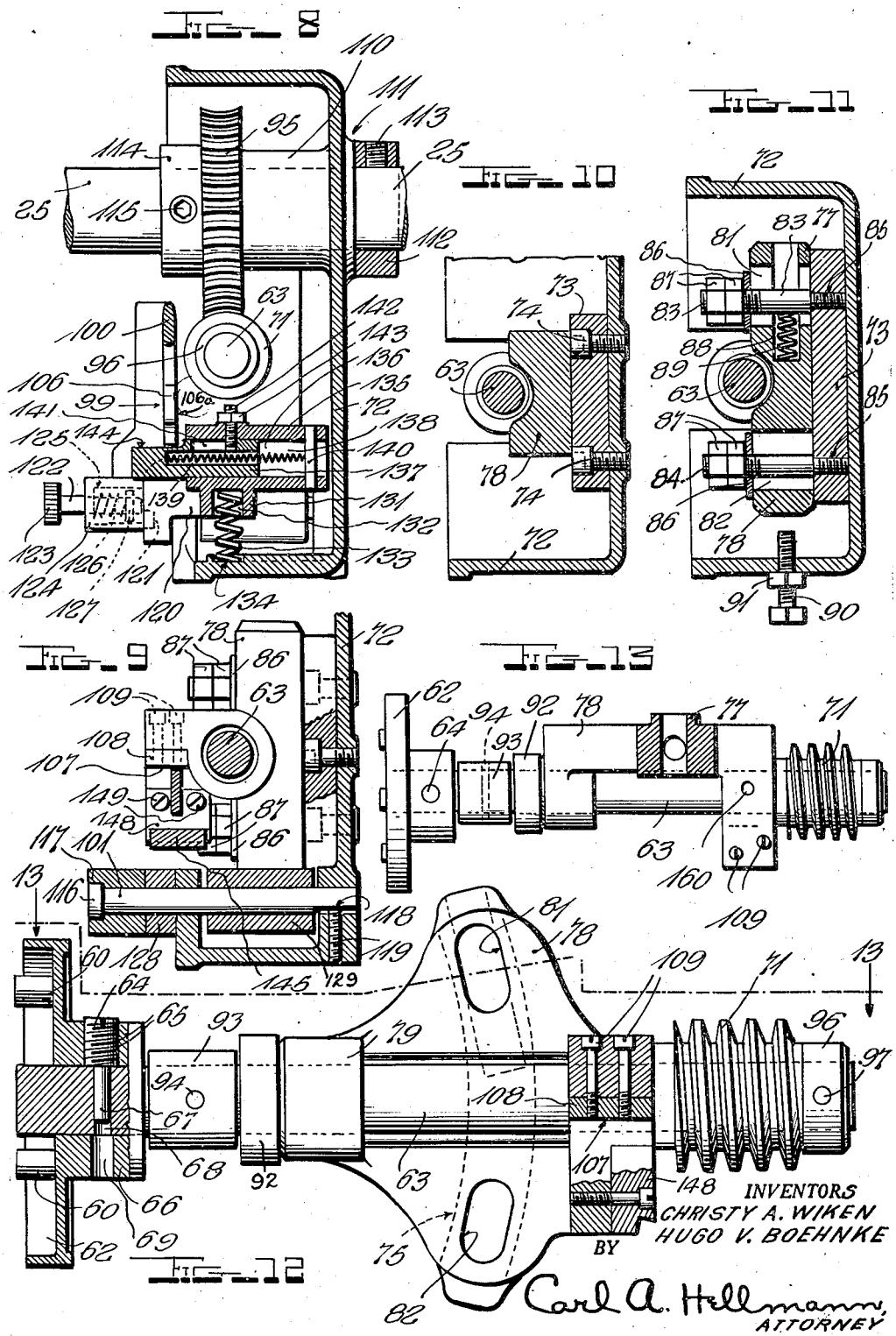

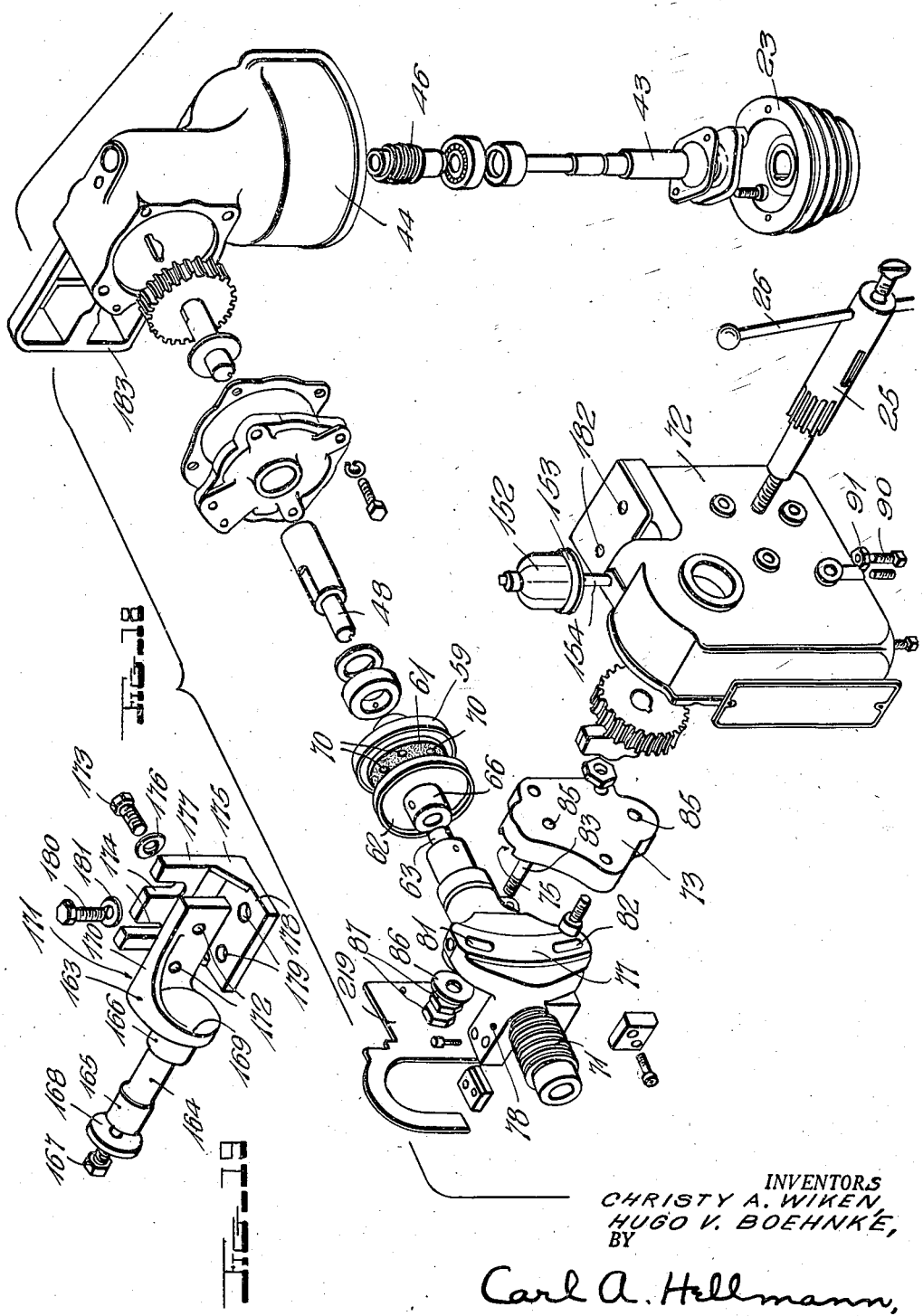

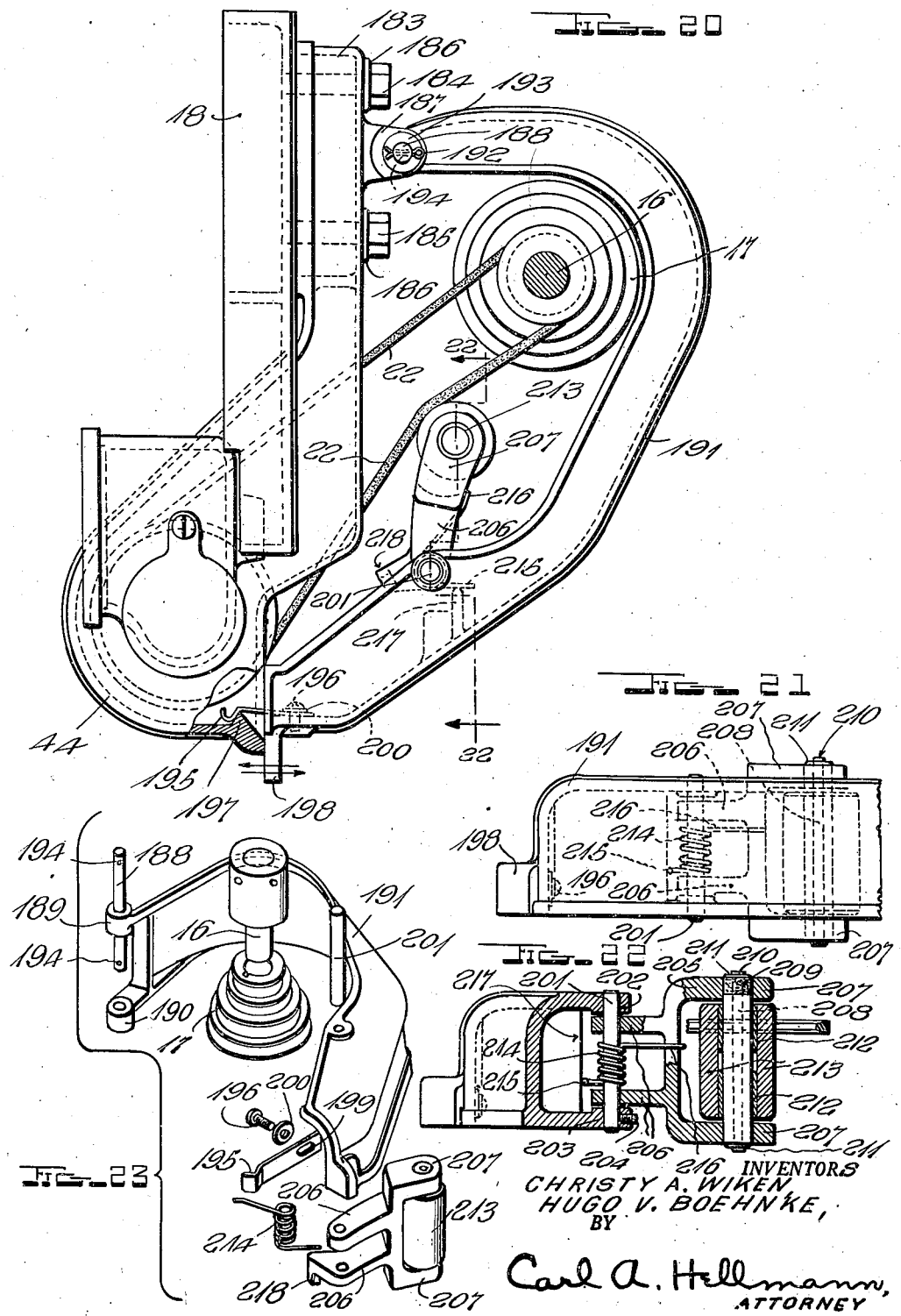

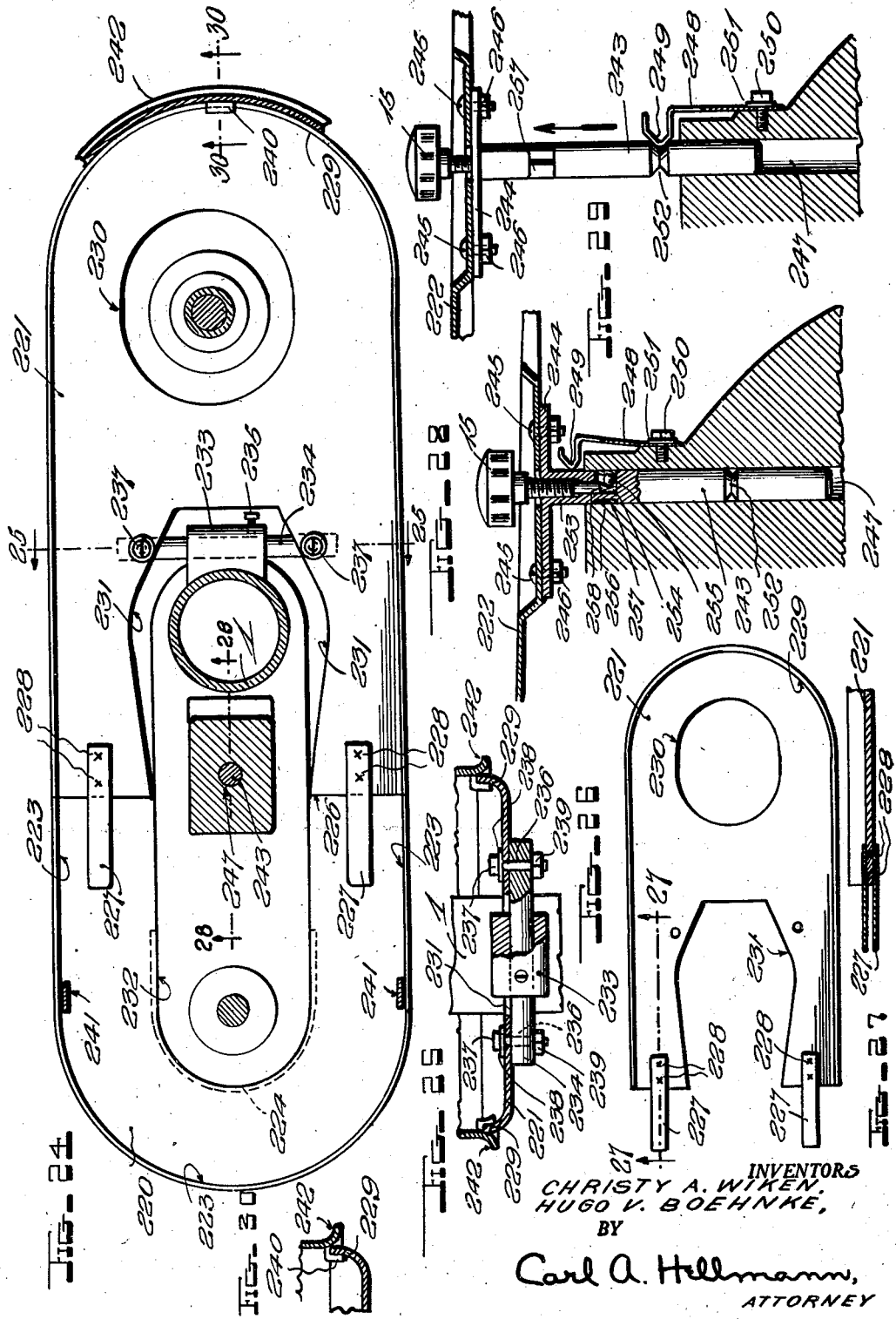

2,396,733

UNITED STATES PATENT OFFICE 2,396,733

DRILLING MACHINE

Christy A. Wiken and Hugo V. Boehnke, Milwaukee, Wis., assignors, by mesne assignments, to The Delta Manufacturing Company, Milwaukee, Wis., a corporation of Wisconsin Application May 5, 1942, Serial No. 441,854

10 Claims. (Cl. 77—33)

The present invention relates primarily to drilling machines, although it is not restricted thereto. An object of the invention is to provide means which may either be built into a drilling machine during the manufacture thereof, or added later to an already existing drilling machine or similar device, in order to provide means for feeding the drill or other cutting tool to the work-piece by a novel automatic mechanically actuated feed mechanism.

A further object is to provide an improved power feed means for use in connection with a drill press or the like, having provision whereby it may receive its power from the same source that actuates the drill press, usually an electric motor or the like mounted on the drill press itself. For this purpose use is preferably made of both ends of the motor shaft, for example, the upper end of the motor shaft may drive the drill spindle, while the lower end furnishes power for the feed mechanism.

Another object is to provide a novel power feed which readily may be thrown into and out of service so that the drill may be fed to the work either manually or automatically as may be expedient in any given instance. This is accomplished by providing gearing having one portion connected to the manual feeding means of the drilling machine and having another portion continually driven by the motor, with provision for interconnecting said two portions when the power feed is to be employed, and for disengaging them from one another when manual feed is desired.

A further object is to provide interlocking devices for holding the said feed mechanism either in or out of driving engagement with the drill press, as desired, and positively preventing the power feed device from accidentally becoming engaged or disengaged as the case may be, while in no way preventing an easy shift from one type of feed to the other when desired.

An additional object is to provide variable ratio drive means for the power feed mechanism, preferably consisting of a pair of cone pulleys mounted respectively upon the motor shaft and upon a driven shaft of the power feed device, with a connecting belt which may be shifted to connect the corresponding steps of the said two pulleys to one another.

A further object is to provide means whereby said connecting belt may be mounted with sufficient looseness on the pulleys to make it easy to shift rapidly when required, and to provide means for automatically taking up the slack in the belt when the power feed is put into service, said slack-removing means consisting of a spring-pressed idler pulley arranged adjacent the belt and adapted to bear against the latter when the guard casing surrounding said belt and cone pulleys is closed.

Another object of the invention is to provide a power drive comprising two separate gear systems, each constituting an assembly complete in itself, and to provide a flexible connecting means between the two assemblies, whereby one of the assemblies may be turned through a slight angle with respect to the other without appreciably disturbing the driving connection between them, whereby the gears connected to the manual feed means may be shifted into and out of engagement at will by relatively tilting their shafts without disturbing the continuous actuation of the two assemblies.

A still further object is to provide a frangible connection between the two assemblies, whereby one of the assemblies may stop if the drill inadvertently meets unexpected or excessive resistance to its feed, so that injury to the power feed mechanism and possibly other elements of the machine is prevented. A preferred form of this frangible device comprises a shear pin through which driving power is transmitted from one assembly to the other.

Another object is to provide a power feed having a tripping abutment in the path of a tripper movable downwardly with the quill, the abutment being movable out of the path of the tripper when manual feed operation is desired.

Among the objects is that of connecting the main drive shaft and the drill-feed shaft by a flexible coupling, and mounting one shaft for tilting movement through a range somewhat more than sufficient to provide for gear engagement and disengagement, with the axis of tilt substantially coincident with the center of the flexible coupling.

Another object is to provide a novel mounting of a power feed housing upon the manual feed shaft, in combination with means for anchoring the said housing in various angular positions about the axis of the said shaft, permitting accurate alinement of the two drive shaft sections.

A further object is to provide a novel oiler assembly, for feeding lubricant to the bearing for the worm shaft enclosed in the housing, as well as to the worm and worm wheel.

An additional object is to provide a range of overtravel of the quill beyond the tripping point, and a positive stop permitting hand feed to perform counterboring and other precision drilling operations to predetermined depths, within very small tolerances.

Another object is to provide novel mechanism for engaging the worm with the worm wheel, comprising a single lever which, when moved in one direction, will comparatively slowly cam the two into mesh against the action of a spring, and when moved in the opposite direction will trip a latch and allow the spring to disengage them quickly.

A further object is to provide a power feed having a member which may be rocked manually to interrupt the feed at any desired point, in the drilling operation, and also having an abutment located in the path of downward travel of a part movable concurrently with the quill, for interrupting the feed automatically after a predetermined extent of quill travel.

A further object is to provide a novel guard for the upper pulleys and belt, provided with means for holding said guard out of the way when the belt is to be shifted or replaced, and having also a locking means for holding it in its guarding position.

Another object is to provide a novel drill press feed mechanism having an automatic stop which is controlled by the depth of feed of the drill spindle, and which automatically disengages the connection between the power feed device and the drill press when a desired predetermined depth of feed has been reached.

Other objects and advantages of the invention in part will be brought out specifically in the following description of an example thereof and in part will be self-evident from the structures disclosed.

In order to explain the invention clearly, a specific form of power feed mechanism, at present believed to be the preferred form, is shown in the accompanying drawings, and described in the specification.

Referring to the drawings,

Figure 1 is a fragmentary perspective elevation as seen from a point in front of and to the right of the mechanism, showing a drill press including the power feed;

Figure 2 is a fragmentary side elevation showing the mechanism as seen from the right;

Figure 3 is a corresponding fragmentary front elevation;

Figure 4 is a vertical central section through the bearing means for the shaft of the rear unit, said shaft being shown in elevation;

Figure 5 is a diagrammatic partly sectional view as seen from the right, substantially on a vertical central plane of the drive shaft connecting the two assemblies comprised in the power drive, the drill press itself being omitted to avoid confusion;

Figure 6 is a corresponding view from the left through the forward casing which contains the drive gear mounted on the manual feed spindle for the drill press, the parts being shown in this figure in the position they assume when the power drive is in service;

Figure 7 is another view of the same structure as is shown in Figure 6 wherein, however, the power feed is out of service, and it will be noted that the flexible connection between the assemblies is here put in service to permit a slight deviation in the axes of the drive shafts;

Figure 8 is a fragmentary sectional view through the drive means and associated parts shown in Figures 6 and 7, the section being made substantially on the planes indicated by the broken line 8—8 of Figure 6;

Figure 9 is a fragmentary sectional view substantially on the plane indicated by the line 9—9 of Figure 6;

Figure 10 is a fragmentary sectional view showing a section made substantially on the plane indicated by the line 10—10 of Figure 6;

Figure 11 is a sectional view showing a section made by the surface indicated by the broken and partly arcuate line 11—11 of Figure 6;

Figure 12 is a partly sectional elevation of the worm and worm shafts and associated mechanism;

Figure 13 is a diagrammatic partly sectional plan view corresponding to Figure 12, the section being made by the planes indicated by the broken line 13—13 of Figure 12;

Figure 14 is an elevation of a guide plate;

Figure 15 is a sectional view of said guide plate, the section being made on the planes indicated by the broken line 15—15 of Figure 14, both Figure 14 and Figure 15 being on a reduced scale;

Figure 16 is a partly sectional detail of a bracket and spring pressed pin for use in controlling the putting into and out of service of the power feed;

Figure 17 is a section through the structure shown in Figure 16 on the planes indicated by the broken line 17—17;

Figure 18 is an exploded view showing the principal structural elements of the power feed mechanism;

Figure 19 is an exploded view showing a bracket used for attaching the said mechanism to an existing drilling machine;

Figure 20 is a plan view, partly broken away, showing the means for tensioning the drive belt for the power feed device automatically, upon closing the guard casing for said belt;

Figure 21 is a fragmentary detail of this tensioning means, showing the idler and the spring for actuating the same;

Figure 22 is a section through the idler and associated elements, the section being made on the planes indicated by the broken line 22—22 of Figure 20;

Figure 23 is an exploded view of the tensioning means and belt guard;

Figure 24 is a plan view, partly in section, showing the two pieces that form the bottom closure of a guard for the main drive pulleys and belt of the machine;

Figure 25 is a fragmentary vertical section through the guard and supporting means for the same, on the plane indicated by the line 25—25 of Figure 24;

Figure 26 is a plan view of the rear piece of the bottom closure;

Figure 27 is a fragmentary detail showing a vertical section through one member of a fork-joint for connecting the pieces of the bottom closure, the section being made on the plane indicated by the line 27—27 of Figure 26;

Figure 28 is a fragmentary vertical section through the upper shell of the guard and a portion of the frame of the machine, on the plane indicated by the line 28—28 of Figure 24, and showing the shell in its lowermost, locked position;

Figure 29 is likewise a fragmentary vertical section on the same plane as Figure 28, but showing the shell in its raised position, giving access to the pulleys and belt; and Figure 30 is a fragmentary vertical section on the plane indicated by the line 30—30 of Figure 24, showing one of the hooks that support the shell on the flanges of the bottom closure.

In all the figures corresponding elements are indicated by similar reference characters.

Referring first to Figures 1 and 2, it will be noted that the drilling machine to which the invention is here applied comprises a supporting column 1, carrying a table 2 which is attached thereto by means of the sleeve 3 and screws 4. The table 2 may be shifted up and down the column 1 as desired and thereafter clamped to the column in adjusted position in any desired way, for example by means of the screws 5. A suitable collar 6 may also be secured to the column 1 at any desired position by means of the screw 7 or the like, to serve as an abutment for the bearing 260 which supports the rack bar for raising or lowering the frame 8, as in Patent 2,122,966 for example.

The drill press head 8 is also carried by the column 1 and in turn carries the rotatably mounted drill spindle 9 actuated by the motor 10 through cone pulleys 11 and 12 connected by belt 13 and enclosed in a novel guard 14 which in turn is secured to the drill press head by means of a novel assembly that will be hereinafter described and embodying a manually operable screw means 15, these parts being best shown in Figure 2.

The motor 10 which operates the spindle 9 is shown with its shaft 16 extending both above and below the motor casing, the cone pulley 12 being carried by the upper end of the shaft and another cone pulley 17 by the lower end thereof. The motor is mounted on the support 18 carried by studs 19 slidably mounted in the lugs 20 on the drill press head or frame 8. This permits adjusting the belt 13 to the requisite tension, by sliding said studs 19 in or out and then securing them, as by the cap screws 21 or the like. Obviously this will not vary the tension of the belt 22 connecting the cone pulley 17 with a companion cone pulley 23, provided for a purpose which will be explained fully hereinafter and therefore will not disturb the proper tensioning of said belt 22. A special means for relieving the tension of the belt 22 is provided also, and will be described later.

Means are provided for feeding the drill spindle 9 in a vertical direction and these means may be of any conventional type, usually including a rack-and-pinion drive for the quill 24, the pinion being formed on or carried by the spindle 25 so that manual rotation of the said spindle by means of the handle 26 will feed the drill spindle 9 up or down in the customary manner. It will be shown later how the spindle 25 is used also to provide power feed of the drill spindle to the work, by means of the present invention.

Means are provided for controlling the depth of feed of the spindle 9 as shown in Figures 1, 2 and 3. These means provide a threaded rod 27 having a flattened front surface 28 and a flattened rear surface 29. This rod is carried by the quill 24 by means of the fitting 30 secured to the lower end of said spindle by the screw 31, the rod 27 being threaded into said fitting and secured against turning in any desired way, for example by means of the lock nut 32, so as to maintain the surfaces 28 and 29 in front and in back, respectively. These flattened portions are received within a notch 33 formed in a portion of the head so that the rod 27 may slide vertically in said notch as the quill moves up and down. A nut 34 is threaded on the rod and a corresponding nut 35 is also threaded thereon, a plate 36 being held between them for a purpose which will be described later. Obviously when the lower surface of the nut 34 reaches the upper surface of the metal surrounding the notch 33, the downward motion of the drill spindle 9 will be stopped automatically, and this affords an opportunity of adjusting the vertical feed or depth of cut, by screwing the nut 34 up or down as required. The nut 35 will then act as a lock nut, while the piece 36 may be considered as a washer between the two nuts, so that once the nut 34 is adjusted to secure the proper depth of drilling, the adjustment may be secured against accidental change by the lock nut 35.

The plate 36 also carries a rod or pin 37 which may be held in any desired way, for example it may be secured between nuts 38 and 39 threaded upon the upper end of the pin 37. This rod 37 acts as means for automatically throwing the power feed out of service when a predetermined depth of drilling has been attained, by engaging a pin which throws a worm out of engagement with the corresponding worm wheel, as will be described later.

With this background relating mainly to the structure of the drill press itself, it will now be possible to discuss the power feed device which cooperates with said drill press. Upon referring to Figure 1, it will be noted that said power feed device preferably comprises two distinct units or assemblies 40 and 41, each of which is enclosed in an independent casing, a shaft extending from one to the other and having a flexible coupling 59—62 interposed therein.

Referring first to the rear unit 40, which provides the first speed reduction, as shown best in Figures 4 and 5, it will be noted that this comprises the cone pulley 23 which receives power from the belt 22 of Figure 2 and drives the vertical shaft 43 which is mounted in the casing 44 by means of suitable bearings 45 and 46, the bearing 46 being here shown as of the ball type. The shaft 43 carries a worm 46 which is in mesh with the worm gear 47 carried by the shaft 48, which it will be seen has its axis at a slight angle to the horizontal. It is of course easily possible to provide any desired angle by suitably designing the worm 46 and the worm wheel 47 engaged therewith, and it should also be understood that while it is convenient to incline the shaft 48 to the horizontal, this is by no means essential in all cases. The casing 44 has a cover 49 carrying a bearing housing 50 for the shaft 48 and the rear end of said shaft is supported in a cooperating bearing 51 which may be formed in the casing itself. The cover 49 is secured to the casing in any preferred way, as by the cap-screws 52 illustrated. A collar 53 bears against the front surface of the cover 49 and is secured by a suitable screw 54 to the bearing bushing 55, which is flattened as shown at 56 to provide an abutment for the set screw 54. The collar 53 thus prevents the shaft and sleeve from being pushed into the casing, while flange 59 keeps it from coming out when in operation. It is also to be understood that while it is preferred to drive the power feed from the lower end of the motor shaft, it could also be driven by the drilling spindle, as by means of a four-step cone on the drilling spindle or the upper end of the motor shaft connected by a V-belt to another four-step pulley attached to a shaft extending upwardly from the first worm gear assembly or rear unit 40, or an extension of shaft 43 without departing from the spirit of the invention.

The shaft 48 has one member 57 of a flexible joint secured thereto, as by the headless set screw 58 or other means, said member having a flange 59 carrying three studs or drive pins 60, preferably evenly angularly spaced. These studs 60 engage in holes in the yieldable disk 61, preferably made of rubber or similar material, with fabric or the like embedded therein, to provide flexibility combined with sufficient stiffness and strength.

The companion flange 62 preferably is identical with the flange 59 in all essential respects, but is secured to the shaft 63 of the other unit by the shear pin 64, instead of a set screw. This shear pin is made of suitable material, such as brass for example, having less strength than would be available in a key or set screw, and is so designed that it will fail by shearing before an excessive force is transmitted to the front unit through the flexible joint, so as to prevent injury or breakage of the other parts. The shear pin 64 has an externally threaded head fitting in the threads 65 of the hub 66 of the flange 62, and has a stem 67 of reduced diameter, fitting into the bore 68 of the shaft 63, the hub 66 having a hole 69 in line with the bore 65, so that when a pin shears off, the head 64 will first be removed from the flange, and then the reduced end may be removed easily through the alined holes 65 and 69, when the hole 68 is turned into line therewith.

The flexible disk 61 preferably has six holes therein, as shown at 70, in Figure 18, these holes being evenly spaced, so that three of them will receive the studs 60 of flange 59, while the remaining three will receive the corresponding pins 60 of the flange 62. Of course this is an arbitrary number, but it is the simplest satisfactory arrangement in most cases. The holes 70 preferably are large enough to receive the pins 60 freely, even when the flanges 59 and 62 are slightly out of parallel, so that no binding occurs when the shafts 48 and 63 are at a slight angle to each other, as happens when the power feed is out of service. The disk 61 of course should also be fitted loosely in the flanges, and in particular should have some axial clearance, to prevent binding when the shafts tilt.

The shaft 63 carries a worm 71 at its forward end, as shown best in Figures 6 and 7. The front unit or secondary gear reduction 41, has a casing 72 for housing and protecting its elements. This casing carries an arcuate track or guide, preferably provided by the plate 73, secured to the housing 72 by screws 74, and having a groove 75 therein, formed as the arc of a circle having its center at the center of the flexible joint, as indicated at 76 in Figure 7. As this groove 75 provides a bearing for the shaft 63, it will be seen that said shaft may tilt slightly about the said center point 76, while producing the minimum disturbance of the flexible connection because the relative tilt of the shafts occurs about a center located at the flexible coupling.

In the arcuate track 73 slides an arcuate rib or projection 77, rising from one surface of the bracket 78, which carries the spaced bearings 79 and 80 for the shaft 63. This bracket 78 has two elongated holes 81 and 82 extending therethrough, to receive the bolts 83 and 84, which preferably are stud-bolts, having one end of each threaded into one of the tapped holes 85 in the plate 73, said studs projecting out through the slots 81 and 82, and receiving the washers 86 and the nuts 87. It will be noted that there are two nuts on each stud, the top one serving as a lock nut. These nuts are to be screwed up just tightly enough to allow the bracket rib 77 to slide freely but without undue play in the arcuate groove of the plate 73.

The bracket 78 has a cavity therein, as indicated in dotted lines at 88 in Figures 6 and 7, in which is housed a spring 89, the lower end of which bears against the bottom of the cavity, while the other end bears against the stud 83, so that the spring thus tends to force the bracket 78 downwardly, from the gear-meshing position indicated in Figure 6, to the gear-unmeshing position shown in Figure 7. The downward movement of this bracket is limited by the screw 90, which is threaded through the bottom of the casing 72, and may be secured against accidental shifting by the lock nut 91 on said screw. The upper end of this screw will abut against the lower corner of the bracket when the latter has been moved down far enough to cause the worm to be sufficiently clear of the worm wheel, by means which will be described later.

A sleeve or collar 93 is secured to the shaft 63, as by a pin 94, and a ball thrust bearing 92 is preferably interposed between the collar and the adjacent end of the bearing 79, to absorb the end-thrust existing when the worm 71 is driving the worm wheel 95. As clearly seen in Figure 12, collar 93 transmits the thrust from shaft 63 to bearing 92 which in turn transmits the thrust to bearing 79 formed on plate 78. As a consequence, the end thrust is transmitted from bracket 78 to casing 72 through arcuate rib 77 and groove 75 and little or no end thrust is transmitted to worm 71. This worm is secured to the shaft 63 in any desired way, and a collar 96 is then placed on the end of the shaft 63, and secured by a pin 97 or equivalent means, to prevent the worm 71 from slipping endwise, when driving the worm wheel 95.

The worm wheel 95 is preferably keyed to the spindle 25, as shown at 98, so that the said spindle will be turned positively by the worm wheel when the power feed is in service. It will be seen that this spindle 25 is the same one that feeds the quill 24 when the manual feed is in use, and this is one of the important features of the invention, since a drilling machine may be sold initially with only the manual feed means, and at a later date, if it becomes desirable to provide power feed, it is necessary only to remove the original spindle 25, and substitute another one having the worm wheel 95 thereon, in addition of course to adding the remaining gearing, etc. The important point is that the drilling machine may readily be provided with the power feed means with the minimum of trouble and without discarding many of its original elements. The manual feed machine, when thus altered, becomes substantially identical with one initially having the power feed built thereinto.

It has been stated above that the worm 71 may be thrown into and out of engagement with the worm wheel 95 at will, and the mechanism for doing this will now be described. As already mentioned, the entire assembly, consisting of the bracket 78 and all the elements carried thereby, is so mounted as to be capable of a slight degree of pivotal motion about the center point 76 of the flexible joint 59, 61 and 62. This motion is possible because of the arcuate track 75 in the plate 73, and the rib 77 on the bracket 78, both centered at point 76. The spring 89 tends to force the bracket 78 downward toward gear-unmeshing position at all times, but restraining means are provided to prevent such movement, except when intentionally released, as will now be described.

The novel actuating mechanism for the front unit comprises a lever having a cam for forcing the bracket 78 upwardly against the action of spring 89, to place the power feed in service, a separate pivoted latch snapping into place and locking the parts when bracket 78 attains operative position. The latch is also adapted to be actuated either manually by the lever, or automatically by a stop rod on the quill to release bracket 78 and allow spring 89 to quickly snap the gears out of mesh when the drilling operation is completed, sufficient lost motion being provided to permit the lever to effect both engaging and disengaging operations.

These restraining means include a cam 99 carried by an actuating lever 100, here shown as an L-shaped or right-angled lever, which is pivotally mounted at 101, so that the ball-end 102 of this lever may move substantially up and down in the course of such pivotal motion. The cam 99 is secured to the lever 100 by the screw 103, and is prevented from shifting by fitting into a groove 104 of proper size in the under side of the lever. The cam 99 has an inclined upper surface 105 at its rear end, and a forwardly extending portion 106 having a flat abutment surface 106a adapted to abut the end of bolt 137, as shown in Figure 7, upon manual movement of bolt 137 to its retracted position and downward movement of lever 100 when it is desired to lock the power feed in inoperative position. The inclined surface 105 coacts with the under surface 107 of a plate 108 secured to the bracket 78, preferably by screws 109, as shown best in Figures 9 and 12. In the latched condition of the parts shown in Figure 6, cam surface 105 is slightly spaced from plate 108 by reason of lost motion in the parts, which permits the lever to drop down a slight distance.

Referring now more particularly to Figures 8 to 13, the details of the shifting means will be described. Figure 8 shows that the shaft 63 is located at a considerable distance to the left of the inner wall of the casing 72, and therefore it is necessary to locate the worm wheel 95 correspondingly spaced from said wall, in order that its central plane may include the axis of the said shaft. This is accomplished readily by means of the boss 110 extending from the wall, and bored to receive the shaft or spindle 25. The worm wheel has a plane surface at its right-hand boundary, and the boss 110 is faced to bear against said surface, to assume any side thrust that may exist, while on the outside of the casing there is a boss 111, likewise having a plane outer face, against which abuts the adjacent face of a collar 112, which is secured to the spindle 25 in any way, as by the set screw 113, so that all play between the worm wheel and the casing may be prevented by positioning said collar properly. The worm wheel 95 is secured against turning on the spindle 25 by the key 98 already mentioned, and is further secured against slipping along the spindle by means of the set screw 115.

The lever 100 is pivotally mounted on the pin 101, which has an enlarged head 116 which rests in the counterbore 117, preventing the lever from moving laterally, the other end of the pin having a flattened portion 118, against which bears the set screw 119, that holds the pin to the casing 72. Also pivotally mounted on the pin 101 is a latching element 120, which lies under the lever 100, and has a hole 121 therein adapted to receive the end of the pin 122, when said pin 122 is in line therewith. The pin 122 has a knurled head 123, and is mounted to slide in the boss or lug 124 formed on the lever 100. This lug has a cavity 125 therein to receive a spring 126 encircling the pin 122, and bearing against the flange or projection 127 of the pin 122, thus urging said pin 122 toward the element 120.

This element 120 comprises two alined lugs 128 and 129, both pivoted on the pin 101, as best shown in Figure 9, these lugs being connected by a bridge 130, Figures 16 and 17. A lug 131 having a downwardly opening bore 132, is also provided on the element 120, said bore housing a spring 133, the other end of which is retained in the cavity 134 in the inside of the bottom wall of the casing 72, as shown in Figure 8. This spring 133 thus urges the element 120 to pivot about the pin 101 in the opposite direction that the spring 89 tends to move the bracket 78, that is, it tends to lift the element 120 in opposition to the downward push of the said bracket, toward latching position.

The element 120 comprises further a horizontal boss or lug 135 having a bore 136, in which slides a bolt or latch 137, urged forward by the spring 138 housed in the bore 139 of said bolt, and bearing at its rear end on the pin 140. The bolt 137 has a slot 141 therein, into which extends the lower end of a screw 142, threaded through the boss 135, and secured by the lock nut 143. The bolt 137 is therefore capable of reciprocating in the bore 136 through a range determined by the length of the slot 141. The upper surface of the front end of this bolt is flattened, as shown at 144. Referring now to Figures 6 and 7, it will be seen that the nose at the right-hand end of the cam 99 bears on this flattened surface 144, when the bolt is extended forward, but passes over the front end of the bolt when the latter is pushed back, these two conditions being shown in Figures 6 and 7 respectively.

The element 120 also has a plate 145 secured to its upper surface, by screws 146 or the like, as shown in Figures 16 and 17, this plate having a nose 147 thereon, shown engaged in a notch in the lower right-hand corner of another plate 148 in Figure 6, and disengaged therefrom in Figure 7. The plate 148 is secured to the bracket 78 by screws 149 or the like, as shown in Figure 9. A screw 150 is threaded through the bottom wall of the casing 72 as shown in Figures 5, 6 and 7, for example, and has a lock nut 151 thereon. This screw is intended for the purpose of adjustably limiting the downward travel of the element 120, to permit sufficient movement to allow the worm 71 to become disengaged from the worm wheel 95, and a certain extent of extra travel, whereupon the screw may be locked against accidental shifting by means of the lock nut 151.

Novel means are provided for lubricating the gears and the shaft bearings in all shifted positions of the shaft as follows.

A container 152, preferably made of a transparent but non-glass material, such as the plastics of the methyl-methacrylate resin class, known by the trade name of "Lucite" or the like, is mounted on a metal base 153, having a tubular outlet 154 leading into the casing 72, and terminating in a tube of smaller bore 155, within said casing, shaped to reach nearly into the location at which the worm 71 and worm wheel 95 intermesh, as shown. A metal cap 156 is hinged to a ferrule 157 on the container, and a spring 158 at the hinge normally keeps the container closed. The tube 155 preferably extends up into the container to a point near the cap 156, and a wick 159 leads into said tube within the container, and extends to a point near or at the bottom of the container, to feed liquid into the tube 155. The structure just described is intended to serve as a lubricator, the container being transparent to show the level of oil therein, but non-brittle, to prevent breakage in its exposed position, the wick serving to feed the oil into the tube 155 by capillary action, the oil then passing to the side of worm-wheel 95 and dripping on worm 71, some oil eventually reaching the oil-hole 160 (Figure 13) leading to the shaft 63 near the worm 71, so as to lubricate the bearing there, the discharge point being so located as to insure lubrication of the gears and shaft irrespective of the shifted position of the worm shaft.

The rear assembly 40 is supported by the motor mounting plate 18, Figure 1. In the manual feed drill press, this plate is made approximately square, so as to conform substantially with the shape of the motor bases encountered in the market, as the only purpose of the plate when power feed is not used is to hold the motor. However, when such drilling machine is to be converted to power feed type, an extension is added to the plate to carry the rear unit 40. This is shown at 161 in Figure 1, and it will be understood that a new or substitute plate will be provided, to replace the original square one, when the conversion is to occur. Inasmuch as the rear unit is carried by the motor supporting plate, it is clear that said unit will necessarily move to and fro with the motor itself, whenever the same is moved to adjust the tightness of the main drive belt of the drilling machine, by shifting the motor plate.

The front assembly 41 also needs means to secure it to the drilling machine, and this is readily provided by jointly making use of the manual feed shaft and the bore extending horizontally through the frame, and originally intended to receive the spindle of a foot-actuated feed device, this hole being indicated in dotted lines at 162, in Figure 2. Front casing 72 is rockable for adjustment purposes about the axis of the manual feed shaft, and is ultimately anchored in final position by the device to be now described. A special fitting 163, Figures 1, 2, 5, 6, 7, and 19, having a shank 164 with spaced portions of larger diameter, 165 and 166, which will fit into the bore 162, is attached to the drill press by inserting this portion into said hole, whereupon it may be held by tightening the screw 167 which is threaded into one end, a washer 168 under the head of the screw then bearing against one side of the frame of the drill press, while the shoulder 169 at the end of the portion 166 bears against the other side of said frame. A bracket 170 extends from the shoulder, and has a flat face 171 thereon, and two threaded holes 172 therein. These receive the screws 173, which pass through the slots 174 in an angle-bracket 175, washers 176 being interposed. The bracket 175 has a vertical blade 177 and a horizontal blade 178, the latter having a pair of holes 179 therein, through which pass the screws 180, which are threaded into the tapped holes 182 formed in a portion of the upper surface of the casing 72, washers 181 being placed beneath the heads of said screws. When all these parts are assembled as just described, the casing 72 will thereby be secured to the frame of the drill press. The bracket 163 may be turned about its axis, as needed, and the bracket 175 may be shifted in a direction toward or from said axis, whereby the two brackets jointly afford all the adjustability that may be needed to hold the casing 72 in its correct position, in any angular desired position the latter may assume with respect to the manual feed shaft. Also, minor adjustment of casing 72 is permitted by reason of the fact that the slots and holes in bracket 175 are larger than the diameter of screws 173 and 180. A cover or guard 219 may be applied to the left-hand face of the casing, to protect the mechanism therein (Figure 18).

Referring now to Figures 20, 21, 22 and 23, the novel guard housing and belt tensioning means for the power feed drive will be described. The casing 44 is secured to the motor plate 18 by means of the portion 183 extending from and forming a part of the said casing 44, preferably by means of two bolts or cap screws 184 and 185, with washers 186 under the heads thereof. A lug 187 extends rearwardly from the portion 183, and is bored vertically to receive the pin 188. This pin passes also through the spaced lugs 189 and 190 formed on the guard housing 191, and is secured against loss by the cotter pins 192, passing through holes 194 in the pin 188, washers 193 being interposed.

The housing 191 is thus capable of swinging in a horizontal plane, about the pivot pin 188. A spring catch 195 is secured to the guard at the other end, by means of the screw 196 threaded into the end of the guard, and the bent end of this spring is adapted to hook over a nose 197 formed at the end of the casing 44, the spring being shaped as shown, so that it will engage or disengage according to the direction the guard is moved, the lug 198 forming a convenient grip for so moving it. A slot 199 in the spring, and a washer 200, provide suitable adjustment for the spring, so that it may act as desired to lock or unlock the guard, as will be obvious.

A pin 201 is mounted in two vertically alined holes 202 and 203 in the upper and lower walls of the guard, and secured by the set screw 204. This pin serves as a pivot for a bracket 205, having the two spaced arms 206 at one end, mounted in the guard on the said pin, and having the two spaced arms 207 at its other end, serving to hold another pin 208. The pin 208 is held in place in the bracket by an expansible plug 209 at one end, the pin being hollow to receive a rod 210, which is riveted over a washer 211 at each end, to compress the plug 209, causing it to expand laterally and grip the corresponding arm 207 of the bracket. An idler pulley 213 is mounted on the bearings 212, to rotate freely on the pin 208. A helical spring 214 is placed over the pin 201, one end 215 of the said spring bearing against a fin 217 of the guard, and the other end 216 bearing against the bracket 205, and urging it away from the guard, so that the pulley 213 will bear against the belt 22, and maintain a certain tension therein.

However, when the guard is open, a lug 218 on the lower arm 206 of the bracket will engage the lower wall of the guard, and prevent further motion of the bracket 205 about its pivot, thus keeping the idler pulley in proper position to engage the belt again, when the guard is next closed. When the guard is open, therefore, the tension of the belt 22 will be relaxed, thus making it easy to shift or remove and replace said belt when desired. When the motor is moved toward or from the drill spindle, in order to adjust the main drive belt 13, it will be clear that this will not affect the belt 22, since the two pulleys are both carried by the motor base.

A guard housing 14 is provided to enclose the cone pulley 12 at the upper end of the motor, the cone pulley 11 at the upper end of the drill press, and the belt 13 connecting these two pulleys. This guard is preferably made of three pieces, namely two substantially flat bottom members, lying horizontally at a level just below the pulleys, and an upper shell fitting thereon, and movable vertically upward, so as to expose the belt and pulleys when desired, for shifting or replacing the belt, or for any other reason. Means are provided to secure the upper shell 222 in its lowered position, and other means are also provided to hold this shell at an elevated position, to give access to the contents without necessitating the complete removal of the shell. The bottom is made in two pieces as stated, to facilitate applying it to the drilling machine, inasmuch as a one-piece bottom could not be put in place without removing many parts of the machine. This guard will now be described in detail.

Referring to Figures 3, and 24 to 30, it will be noted that the lower front member 220 is substantially flat, and has an upwardly curved flange 223 at its front and sides, and a downwardly extending flange 224 at its lower central portion, this flange being curved to fit the front of the frame of the drill press, to which it is secured in any way, for instance by the cap screws 225, Figure 3, one on each side of the said frame. The front section 220 meets the rear section at a joint 226, and these two sections are held in alinement with one another by the metal strips 227, which are fixed to one section, here the rear one, preferably by spot-welding, as indicated at 228. Since these strips are in pairs, above and below the sheet metal of which the section is made, they are thus automatically spaced apart correctly to embrace the companion section in the fork thereby formed, so that when engaged the two sections are held properly alined, although they may readily be separated whenever requisite.

The rear section 221 is likewise substantially flat, and has an upturned curved flange 229 like the flange 223 of the front section, and adapted to constitute a continuation thereof when the two sections are in place on the machine. A hole 230 is provided in this rear section, and preferably is approximately circular and concentric with the motor shaft, when the guard is in place. It will be seen that this hole 230 is here shown off the center line of the section 221, because the motor shaft is not in line with the central plane of the machine, but to the left thereof. A slot or opening 231 is provided at the front end of the section 221, and forms a continuation of the slot 232 in the front section when the sections are assembled on the machine.

The combined opening thus formed allows the bottom of the guard to fit down properly on the frame of the drill press, with certain portions of the latter extending through said bottom. A lug 233 at the rear of the frame is bored horizontally to receive a rod 234, which may be held in place firmly by the set screw 235. This rod has a hole 236 at each end, and in line with holes in the rear section 221 when the latter is in proper position, so that the said rear section 221 may be firmly secured to the frame by screws 237 and washers 238, the said screws passing through the section 221 and through the holes 236, and being secured by the nuts 239, as shown.

The upper portion of the guard, namely the single shell 222, is shaped as shown, that is, it is approximately semicircular at its ends, and straight at its sides, matching the combined two lower sections in this respect, but slightly larger, and flared out a little at its bottom edge, so that it will overlap them to a small extent, to afford a better closure and also to improve the appearance. A hook 240 is provided at the inside rear of the shell 222, and engages over the flange 229, while similar hooks 241 attached to the inside of the shell at both sides near the front engage over the flange 223, these three hooks thus keeping the shell in proper place on the lower sections, while the flare 242 surrounding the entire shell at its bottom edge forms a joint-concealing and ornamental finish.

In order to hold the shell 222 in place, despite vibration and accidental knocks, a rod 243 is fastened to the shell, for example by welding a plate 244 to the rod, and securing this plate to the inside top of the shell by the screws 245 and nuts 246. A hole 247 is provided in the frame of the drill press to receive this rod 243 slidably and rotatably. A resilient catch 248 is secured to the frame by the cap screw 250 and washer 251, as shown in Figure 29. The rod 243 has a circumferential groove 252 to coact with the curved end 249 of the catch 248, the said end being shown in the groove in the said Figure 29. The rod is long enough to hold the shell at an elevation sufficient to give access to the pulleys and belt when the catch is thus engaged, and the shell may also be turned about the rod as an axis when so raised, to give still more room to adjust or replace any of the parts normally enclosed in said shell. The shell may be lifted off entirely, if desired, as the rod will slip past the catch when sufficient force is applied, although the power of the spring 248 is ample to hold the shell itself.

When the shell is to be held securely in its closed position, use is made of a locking screw 15, the manually operable head of which extends above the shell as shown. This screw is threaded into an axial bore 253 in the upper end of the rod 243, tapped to receive it, and a crossbore 254 extends into said bore at its bottom, and contains a ball 255, such as a steel "bearing ball." A shallow flat-bottom groove 256 is provided in the rod 243 at the elevation of the cross-bore 254, and a split metal ring 257 is seated in said groove, somewhat as a piston ring would be seated in a piston. This ring 257 is small enough to pass into the bore 247 when the rod 243 is pushed all the way down, until the shell is properly seated on the bottom sections, to enclose the pulleys and belt. The screw 15 has a conical lower end 258, which will push the ball 255 out in the cross-bore 254 when the screw is turned downward, thus forcing the ball against the ring 257, and thereby in turn forcing the said ring to expand and grip the wall of the hole 247, causing it to lock the rod firmly to the frame of the drill press. If and when any wear occurs, it is necessary merely to turn the screw 15 down a little further, so that it will always be possible to maintain a firm hold, preventing accidental lifting of the shell, while it is readily removable whenever desired.

The operation of the guard will be obvious from the disclosure of its structure. The front section of the bottom may be inserted from in front of the machine, and held by the screws 225, without in any way disturbing any adjustment of the machine, or removing any parts thereof, while the rear section can be put in place after the pulley 12 has been taken off. If the hole 230 is larger than the extreme diameter of the said pulley, even this need not be removed, although the removal and replacing of the pulley are simple operations, and require little time.

The operation of the machine is as follows:

The workpiece to be drilled or otherwise acted on is placed on the table 2, and it will of course be understood that it may be held in any conventional way, in a vise, jig, or the like. If manual control of the feed is desired, the pinion shaft 25 is actuated by the handle 26, in the customary way, after the automatic feed has been disconnected by depressing the lever 100. This throws the worm 71 out of mesh with the worm wheel 95, by putting these parts into the positions shown in Figure 7. It will be seen that the parts are locked in these positions by the plate 145, the left-hand end of which bears against the right-hand face of the plate 148, so that the element 120 cannot move upward in response to the spring 133. The bracket 78 meanwhile is held down by the spring 89, and will continue to be so held until the lever 100 is forcibly raised, when the worm will snap back into engagement with the worm wheel.

In this mode of operation the bolt 137 remains at all times fully extended out of the bore in the element 120, with the nose at the right-hand end of the cam 99 bearing against the upper flattened surface 144 of the said bolt, whereby the element 120 is depressed by the said cam when the lever 100 is forced down. When the bolt 137 protrudes thus, the pin 122 cannot enter into the hole 125 in the element 120, and therefore the lever 100 is not latched to the said element, and can be moved up and down at will, independently of the element 120. To make it impossible to trip the lever 100 upward accidentally at a time when actuation of the power feed would ruin the work piece or injure the operator and put the automatic control completely out of service, it is necessary to push the bolt 137 into its cavity in the element 120, as shown in Figure 7, and move the surface 106a of portion 106 of the cam 99 over the forward end of the bolt, continuing the downward movement of the lever 100 until the pin 122 snaps into the cavity 121 in the element 120, thus latching the latter to the lever 100, until such time as the pin is again pulled out of the cavity. When the parts are thus interlocked, the bolt 137 is entirely out of the way of the trip rod 37, so that the machine is set solely for manual operation. To restore the automatic feed it is merely necessary to pull out pin 122 and lift lever 100, which allows the spring to project bolt 137 into its operative position, and at the same time bringing pin 122 out of alinement with cavity 121.

When it is desired to use the automatic feed, the bolt 137 protrudes into the path of said trip pin 37, so that said pin may push the bolt down, near the end of the desired depth of drilling, until finally the element 120 has moved far enough to allow the plate 148 to slip past the plate 145, whereupon the spring 89 will snap the bracket 78 downward into the position shown in Figure 7, (the contacting surfaces of members 148 and 145 being substantially concentric with the pin 101 so that there will be no drop in pitch line engagement of the gears until parts 145 and 148 completely lose engagement with each other) thus suddenly disengaging the worm 71 from the worm wheel 95, thereby stopping the downward feed of the drill. Obviously, this disengagement may be set to occur at any desired level of the drill by proper adjustment of the height of the pin 37 by means of the nuts 34 and 35 on the rod 27, so that the feed will stop when the desired depth of drilling has been attained. When automatic feed is in use, the latch pin 122 will of course be kept out of the cavity 125, so that the lever 100 is not latched to the element 120. In order to reset the machine for the next drilling, the lever 100 is merely raised, to cause the worm 71 to mesh anew with the worm wheel 95, after which the new workpiece is put in place for drilling, whereupon the drilling to the desired depth commences again as soon as the motor is started.

Since there is a certain amount of overthrow, or excess motion available to the element 120 after the tripping takes place, before said element strikes the casing, advantage may be taken of this leeway to provide an exact depth of drilling, in such cases where extremely close tolerances must be maintained, this being accomplished by finishing the feed by hand, after setting the nut 34 to the required degree of precision, so that the exact depth is reached when the under surface of said nut strikes the top of the notched part 33 of the frame 8, which takes place shortly after the trip rod 37 has caused the automatic feed to stop. While the automatic feed will give depths uniform to within about five to seven one-thousandths of one inch, depending upon the hardness of the workpiece, it is possible to work within extreme limits of one one-thousandth of an inch, when counterboring as above described, finishing the feed manually.

The provision of two units in place of a single one has several advantages. In the first place it affords a simple way to attain a great reduction in speed, since each unit embodies a worm drive. In the second place, it allows for variations between individual drill presses, since the two units may be spaced properly to compensate for somewhat different dimensions, by reason of the flexible connection between the shafts of the two units, which also makes it possible to prevent any binding from lack of perfect alinement of the units, and in the third place, the flexible joint provides a simple means to permit the shaft 63 to operate at an angle to the shaft 48 when the worm is disengaged from the worm wheel. The flexible joint also permits the rear unit to be moved forward or back a limited extent, when the motor is adjusted to conform to the belt, without interfering with the proper connection between the two units, since not only will the relatively free drive disk 61 provide some extent of axial shift, but moreover the rear flange 59 may be shifted bodily along the shaft 48 and secured by the set screw 58.

The shear pin 64 will protect the mechanism against injury in case of accidental incorrect setting or operation of the automatic feed, by shearing off when excessive force is applied thereto, and may be replaced quickly and cheaply when so destroyed.

The rear guard for the belt of the feed mechanism is a great convenience, because it automatically tightens the belt when closed, while it loosens it when open, thus facilitating the changing of this belt from one set of pulley grooves to another, in changing the rate of feed.

The method of mounting casing 72 on the manual feed shaft, and supporting the bracket 163 on the drill press by inserting it through a bore in the frame 8, permits turning the casing about the axis of the manual feed shaft and also rocking the bracket as may be necessary about its longitudinal axis, to line the units up properly, and further leeway is afforded by the slots 174 in the bracket 175, permitting a shifting at right angles to said axis, these two adjustments jointly permitting correct setting of the front unit in spite of wide variations in individual machines.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A power feed device comprising a reduction gear including a worm and a worm-wheel to be driven thereby, resilient means urging the worm to disengage from the worm-wheel, a latching means retaining them in mesh, a cam, a lever for operating said cam, said cam having parts respectively coacting with the latch and with means to move the worm to meshed position whereby the lever in one position will cause the cam to release the latch, permitting the resilient means to suddenly disengage the worm from the worm-wheel, while the lever when moved to another position will force the cam to shift the worm back into mesh with the worm-wheel, and also cause the latching means again to lock them in mesh, whereby a single lever thus controls all the operations required.

2. A power feed device as defined in claim 1, having additional means for positively locking the lever in such position that the worm cannot be caused to mesh with the worm-wheel.

3. A power feed for a machine tool having a tool spindle, said feed comprising two reduction gear units, said spindle having a shaft associated therewith for feeding it axially, said shaft being carried by the machine tool, means mounting one of said units in fixed position relative to said shaft on said machine tool, the other of said gear units being provided with a housing, said housing being mounted upon said shaft, and capable of pivotal adjustment about said shaft as an axis, whereby it may be turned as a whole into proper angular position to aline with said one unit, to permit the two units to be connected operatively to one another, and means for rigidly securing said housing in adjusted relation to said shaft.

4. A power feed as defined in claim 3, wherein the housing has an additional slight range of adjustment parallel to said shaft, to permit better alinement of the two units.

5. A power feed for a machine tool having a tool spindle, and a shaft carried by the machine tool and associated with the said spindle to feed it axially, a housing mounted on said shaft, and capable of pivotal adjustment about the axis of the said shaft, to vary the angular position of the housing as a whole, means for securing the housing to the machine tool at a selected position of angular adjustment, a reduction gear unit in said housing, and comprising a worm and a worm-wheel, a shaft carrying said worm and extending out of the housing, a second reduction gear unit carried by the machine tool in fixed relation to said first named shaft and having a shaft extending therefrom and toward the shaft of the first-named unit, said two shafts being alined by virtue of the above-named angular adjustment the housing also being capable of a slight adjustment parallel to the first-named shaft, and means for securing the housing in position, to prevent shift along the first-named shaft and to maintain the worm in properly centered relation to its worm-wheel, comprising a bearing for the said shaft abutting against one face of the worm-wheel within the housing, and a collar on the shaft outside the housing and bearing against an outer wall of the housing, thus positively preventing any axial shift of the worm-wheel relatively to said housing.

6. Operating means for the feed mechanism of machine tool spindles, comprising a driven member, a driving member, bearing means for said driving member, means associated with said bearing means urging the driving member to an inoperative position relative to said driven member, means operative in opposition to the latter means to operatively engage the driving member with the driven member, including a manually operable lever and a cam carried thereby, a relatively movable member to lock the driving member in its operative position, said cam having a part coacting with said locking member in the movement of said lever in one direction to release the driving member for movement to inoperative position by said urging means.

7. The combination defined in claim 6, together with a movable abutment carried by said locking member, and means yieldingly holding said abutment in position for engagement by a part moving with the machine spindle to automatically actuate said locking member to release position, and said cam part upon further movement of the lever in said direction coacting with said abutment to retain the same out of the path of movement of said part.

8. The combination defined in claim 6, together with a movable abutment carried by said locking member, and means yieldingly holding said abutment in position for engagement by a part moving with the machine spindle to automatically actuate said locking member to release position, said cam part upon further movement of the lever in said direction coacting with said abutment to retain the same out of the path of movement of said part, and means for releasably latching the lever against movement from the latter position thereof.

9. A feed means for use in feeding a drill spindle to a work piece, comprising a two part shaft, one part of which is swingable; a worm mounted on said swingable shaft; means for connecting said swingable part to said other part, said means including a flexible joint whereby the swingable portion may be tilted to an angle with relation to said other part; and swingable bearing means journalling said one shaft part intermediate of its ends and between said flexible joint and worm for tilting movement.

10. A drilling machine having a tool spindle, a power feed device for said spindle including coacting disconnectible driving and driven elements, means for disconnecting said elements comprising pre-settable means movable with the spindle for disconnecting said elements to render the power feed inoperative when a work piece is drilled substantially to a predetermined depth, means for manually operating said driven element of the power feed device to continue feeding movement of the spindle for finished drilling of the work to a closer tolerance than could normally be obtained by the power feed, and said pre-settable means including an adjustable stop member to definitely limit such further manual feed of the machine spindle.

CHRISTY A. WIKEN.
H. V. BOEHNKE.